United States Patent [19]

Wakayama et al.

[11] Patent Number: 5,491,628
[45] Date of Patent: Feb. 13, 1996

[54] METHOD AND APPARATUS FOR DOCUMENT TRANSFORMATION BASED ON ATTRIBUTE GRAMMARS AND ATTRIBUTE COUPLINGS

[75] Inventors: Toshiro Wakayama, Webster, N.Y.; Allen L. Brown, Jr., Solana Beach, Calif.; Suryanarayana M. Mantha; An Feng, both of Webster, N.Y.

[73] Assignee: Xerox Corporation, Stamford, Conn.

[21] Appl. No.: 165,785

[22] Filed: Dec. 10, 1993

[51] Int. Cl.⁶ .................................................. G06F 17/27
[52] U.S. Cl. .................... 364/419.08; 395/144; 395/600
[58] Field of Search ...................... 364/419.08, 200 MS; 395/144, 145, 600

[56] References Cited

U.S. PATENT DOCUMENTS

| | | | |
|---|---|---|---|
| 4,686,623 | 8/1987 | Wallace | 364/300 |
| 5,021,943 | 6/1991 | Grimes | 364/289 |
| 5,317,647 | 5/1994 | Pagallo | 382/14 |
| 5,341,469 | 8/1994 | Rossberg et al. | 395/145 |

OTHER PUBLICATIONS

Efremidis et al, "Complexity characterizations of attribute grammar languages", Information & Computation, 1988, 78, No. 3 pp. 178–186 Dialog File 239, Acc #03160759 MR 90B #68047.

Kuhnemann, "Synthesized and inherited functions. A new computational model for syntax-directed semantics", Acta Informatica, vol. 31, No. 5, pp. 431–477 Dialog file 2, Acc #4765370.

LeFevre, "Lexical Preanalysis of Compound Words to Resolve Ambiguities", EDF—Electricite de France Liamart, France, 15 pp. Aug. 1992, Dialog file 2, Acc. #4487391.

Fischer, Ronald, "Functional Programming and FPCA '89", Dr. Dobb's Journal, v14, n12, p96 (6).

Purtilo et al, "PARSE–TREE Annotations", Communications of the ACM, v32, n12, p1467 (11).

*Primary Examiner*—Gail O. Hayes
*Assistant Examiner*—Frantzy Poinvil
*Attorney, Agent, or Firm*—Oliff & Berridge

[57] ABSTRACT

A method and apparatus are provided for converting a first document to a second document. The first document is in a first extended attribute grammar, while the second document is in a second extended attribute grammar. An extended attribute coupling grammar couples the first and second extended attribute grammars. The first document is converted to a first tree, which is partially copied to a first copy. The first copy is completed by evaluating it's attribute with respect to the extended attribute coupling grammar. The first copy is then a partially attributed tree of the second document. The partially attributed tree is completed to form a second tree based on the second extended attribute grammar. The second tree is then converted to the second document.

20 Claims, 8 Drawing Sheets

Company
  synthesized: *average-salary*
  inherited: none
  imported: none
Mgt
  synthesized: *num-of-people, total-salary*
  inherited: *average-salary*
Tech
  synthesized: *num-of-people, total-salary*
  inherited: *average-salary*
Employee
  synthesized: none
  inherited: none
  imported: *name, salary, nationality*

Attribute grammar
Company → Mgt Tech
  Mgt.*average-salary* = Mgt.*total-salary* / Mgt.*num-of-people*
  Tech.*average-salary* = Tech.*total-salary* / Tech.*num-of-people*
  Company.*average-salary* = (Mgt.*total-salary* + Tech.*total-salary*) /
        (Mgt.*num-of-people* + Tech.*num-of-people*)

Mgt → employee$^+$
  Mgt.*total-salary* = sum((employee[$i$].*salary*)$_1^{count}$)
  Mgt.*total-salary* = Mgt.*count-employee*
Tech → employee$^+$
  Tech.*total-salary* = sum((employee[$i$].*salary*)$_1^{count}$)
  Tech.*num-of-people* = Tech.*count-employee*

FIG. 3

Attribute Declaration
I-U-comparison
  synthesized: *average-salary*
  inherited: none
  imported: none
India
  synthesized: *num-of-people, total-salary*
  inherited: *average-salary*
USA
  synthesized: *num-of-people, total-salary*
  inherited: *average-salary*
Indian
  synthesized: none
  inherited: none
  imported: *name, salary*
American
  synthesized: none
  inherited: none
  imported: *name, salary*

Attribute Grammar
I-U-comparison → India USA
  India. *average-salary* = India. *total-salary* / India. *num-of-people*
  USA. *average-salary* = USA. *total-salary* / USA. *num-of-people*
  I-U-comparison. *average-salary* = (India. *total-salary* + USA. *total-salary*) /
      (India. *num-of-people* + USA. *num-of-people*)
India → indian $^+$
  India. *total-salary* = sum((indian[i].*salary*)$_1^{count}$)
  India. *num-of-people* = India. *count-indian*
USA → american $^+$
  USA. *total-salary* = sum((american[i].*salary*)$_1^{count}$)
  USA. *num-of-people* = USA. *count-american*

FIG. 5

Attribute Declaration
Company
  synthesize: *result-tree* inherited: none
  imported: none
Mgt
  synthesized: *indian-list, american-list*
  inherited: none
  imported: none
Tech
  synthesized: *indian-list, american-list*
  inherited: none
  imported: none
Employee
  synthesized: *indian-tree, american-tree*
  inherited: none
  imported: *name, salary, nationality*

Attribute Coupling
Company → Mgt Tech
    Company.*result-tree* =
        I-U-comparison (India(Mgt. *indian-list* Tech. *indian-list*)
                        USA(Mgt. *american-list* Tech. *american-list*))
Mgt → employee $^+$
    Mgt. *indian-list* = (employee[i].*indian-tree*)$_1$ $^{count}$
    Mgt.*american-list* = (employee[i].*american-tree*)$_1$ $^{count}$
Tech → employee $^+$
    Tech. *indian-list* = (employee[i].*indian-tree*)$_1$ $^{count}$
    Tech. *american-list* = (employee[i]. *american-tree*)$_1$ $^{count}$
employee →
    employee. *indian-tree* =
        if employee.*nationality* == "india"
        indian(employee.*name*, employee.*salary*)
        else nil
    employee. *american-tree* =
        if employee.*nationality* == "USA"
        american(employee.*name*, employee.*salary*)
        else nil

FIG. 7

METHOD AND APPARATUS FOR DOCUMENT TRANSFORMATION BASED ON ATTRIBUTE GRAMMARS AND ATTRIBUTE COUPLINGS

BACKGROUND OF THE INVENTION

1. Field of the Invention

This invention relates to a method and apparatus for transforming an attributed tree valid under an attribute grammar to another attributed tree valid under another attribute grammar.

2. Background of the Invention

Some of the expected (but only partially realized) benefits of electronic documents over paper documents include enhanced document processing capabilities and easier manipulation of documents, such as creation, editing, updating, storage, access, and delivery of documents. A key enabler for such enhancement in known systems is their ability to represent not only the contents of documents but also various meta-information about the contents. For instance, document structures such as chapter, section, and paragraph breaks can be explicitly represented for enhanced browsing, retrieval, and component reuse.

However, one central technical problem involves how to represent such meta-information in a way computers and humans can easily manipulate. One prominent approach to this problem is to adapt formal grammars (used to describe programming languages) to represent hierarchical structures of documents (e.g., chapter, section, and paragraph breaks). The Standard Generalized Markup Languages (SGML), for instance, uses an extension of context-free grammars for this purpose.

This invention addresses two insufficiencies in the existing grammar-based approaches to representing and manipulating electronic documents. First, these approaches have only a limited capability to specifying attributes and their dependencies. For example, an attribute of "section" may depend on certain attributes of "chapter". Second, these approaches have an inadequate ability to specify and compute document transformation. That is, they are unable to fully transform document instances as derivation trees of one grammar to document instances as derivation trees of another grammar.

The first limitation leads to the second. The idea of document transformation is important for a variety of reasons. For example, while the notion of grammar-based document schema is useful in capturing structural information of documents, it also imposes some rigidity on kinds of documents one can create under a given schema. Because one often wishes to modify the given schema in order to accommodate features of document design not originally considered, this creates the need to transform documents from the given schema to the modified schema. Additionally, some institution documents are so large and complex that it is highly desirable to be able to specify and compute more customized and manageable views as a document transformation. Furthermore, it is often possible and desirable to automatically assemble documents from existing documents as a document transformation. For example, generating a draft of a technical report of a research laboratory from previously submitted project reports.

SUMMARY OF THE INVENTION

Therefore, what is needed is a method and apparatus for specifying the generic properties common to a class of documents as an extended attribute grammar, specifying the transformation from the extended attribute grammar to another extended attribute grammar as an extended attribute coupling, and computing the transformation as an attribute evaluation.

Thus, this invention provides a method and apparatus for specifying generic logical structures of documents as extended attribute grammars. This invention additionally provides for a method and an apparatus for specifying the transformation from one class of logical structures to another class of logical structures as another extended attribute grammar.

This invention further provides for a method and apparatus for transforming one class of documents to a second class documents by a transformation from a first extended attribute grammar to a second extended attribute grammar, the transformation specified as an extended attribute coupling.

This invention further provides for computing the transformation from the first document to the second document as an attribute evaluation.

In order to realize these and other objectives and overcome the disadvantages in known approaches, the method and apparatus for transforming a first document to a second document comprises: specifying the class of a first document as an extended attribute grammar and the class of a second document as a second extended attribute grammar where the first and second documents are represented by trees generated from the first and second extended attribute grammars, and where the extended attribute grammars comprising logical and non-logical attributes, the non-logical attributes comprising imported, inherited and synthesized attributes; transforming the first document to the second document by specifying an extended attribute coupling between the first extended attribute grammar and the second extended attribute grammar; and computing the transformation from the tree of the first document to the tree of the second document as an attribute evaluation of the first extended attribute grammar in terms of the second extended attribute grammar. The method and apparatus for computing the attribute evaluation comprises: copying a first source tree of the first document generated from a first extended grammar into a second source tree, keeping only those imported attributes of the extended attribute coupling; evaluating the inherited and synthesized attributes of the second source tree in terms of the extended attribute coupling to produce a partially attributed tree for the second extended attribute grammar; and evaluating the remaining attributes of the partially attributed tree with respect to the second extended attribute grammar to produce the second document.

BRIEF DESCRIPTION OF THE DRAWINGS

This invention will be described in detail with reference to the following figures, in which like reference numerals refer to like elements, and wherein:

FIG. 3 is a extended attribute grammar for a first document;

FIG. 5 is an extended attribute grammar for the second document;

FIG. 7 is an attribute coupling grammar for coupling the first extended attribute grammar to the second extended attribute grammar;

DETAILED DESCRIPTION OF THE PREFERRED EMBODIMENTS

An alphabet is a nonempty finite set of symbols. Thus, if A is an alphabet, a string over A is a finite sequence of symbols from A. The empty string, denoted by $\epsilon$, is the string consisting of zero symbols. A language over A is a possibly infinite set of strings over A. A regular expression over A is associated with a regular language over A, where $L(r)$ is the language associated with a regular expression "r". Therefore, if "$\alpha$" is a string over A, then $\alpha$ is a regular expression over A and $L(\alpha)=\alpha$, i.e., the set consisting of a single string $\alpha$. In particular, $\epsilon$ is a regular expression, and $L(\epsilon)=\{\epsilon\}$. In addition, if "r" and "u" are regular expressions over A, so is their concatenation "ru", and:

$$L(ru)=\{\alpha\beta || \alpha \epsilon L(r) \text{ and } \beta \epsilon L(u)\} \quad (1)$$

That is, $L(ru)$ is the set of all strings that can be constructed by concatenating a string from the language of "r" and a string from the language of "u", in that order. Furthermore, if "r" and "u" are regular expressions over A, so is their union "r|u", and:

$$L(r|u)=L(r) \cup L(u); \quad (2)$$

Further, if "r" is a regular expression over A, so is its Kleene closure "r*" and:

$$L(r^*)=\{\epsilon\} \cup L(r) \cup L(rr) \cup L(rrr) \cup \ldots, \quad (3)$$

That is, $L(r^*)$ is the set of all strings that can be constructed by concatenating zero or more strings from the language of "r" an arbitrary but finite number of times.

In addition, $r^+$ is used to denote the regular expression "r(r*)". Thus, the language of "$r^+$" is the set of all strings that can be constructed by concatenating one or more strings from the language of "r". That is, $L(r^*)$ includes a finite number of strings each having a different multiple of "r", and the empty set $\epsilon$, while $L(r^+)$ includes all of $L(r^*)$ except the empty set $\epsilon$. For convenience, a string of a regular expression is a string in the language associated with that regular expression.

A context-free grammar with regular extension, or simply an extended context-free grammar for short, is a tuple $G=(V, \Sigma, P, Z)$. V is an alphabet called the vocabulary of G, and the members of V are called (grammar) symbols of G. $\Sigma$ is a subset of V, and the members of $\Sigma$ are called terminal symbols of G. The symbols of V which are not terminal symbols of G are called nonterminal symbols of G. Z is a designated nonterminal symbol of G called the start symbol of G. P is a finite set of productions of G. The productions of G are in the form:

$$q: X \rightarrow r \quad (4)$$

where "q" is the name of the production, X is a symbol of G and "r" is a regular expression over V−{Z}. If X is a terminal symbol, "r" is the empty string $\epsilon$.

Figure 1:
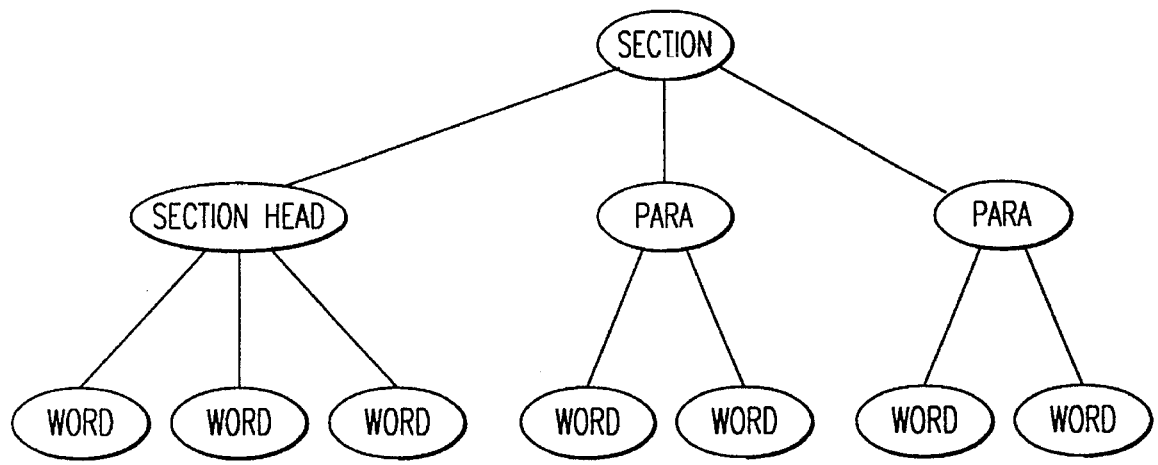
FIG. 1 is a generalized derivation tree.

The nonterminal symbols start with an upper case letter, whereas terminal symbols are all in lower case. FIG. 1 shows an example of an extended context free grammar $G_1$.

In the extended context free grammar $G_1$ shown in FIG. 1, the terminal symbol $\Sigma_1$ of $G_1$ is the symbol "word". The start symbol $Z_1$ of $G_1$ if the symbol "Section". The vocabulary $V_1$ of $G_1$ is "Section, SectionHead, Paragraph, Summary, word". Thus, the productions "$q_n$" are:

$q_0$: Section→Head$^+$(Summary|$\epsilon$)

$q_1$: SectionHead→word$^+$ $q_2$: Paragraph→word$^+$ $q_3$: Summary→word$^+$ (5)

The production "$q_0$" states that each Section comprises a SectionHead followed by one or more Paragraphs and possibly by a Summary. The production "$q_1$" states that each SectionHead is a sequence of one or more words. The production "$q_2$" states that each paragraph is also a sequence of one or more words. Finally, the production "$q_3$" states that each summary is also a sequence of one or more words. Further, for any production, "q: A→r", of an extended context-free grammar, an instance of the production is:

$$A \rightarrow \alpha,$$

where $\alpha$ is a string in the language $L(r)$ of the regular expression "r". For instance, production "$q_0$" above has the following possible instances, although it is not limited to these instances:

Section→SectionHead Paragraph Paragraph Paragraph Summary
Section→SectionHead Paragraph Paragraph Paragraph Paragraph Paragraph For an extended context-free grammar G, a derivation tree of G, or simply a tree of G, is an ordered, labeled tree such that every node is labeled with a symbol of G. Then every internal node (i.e., a node having one or more children) is associated with a production of G. Thus, for every internal node, if its label is "A" and if the labels of its children are "$X_1, X_2, \ldots X_n$" from left to right, "A→$X_1 X_2 \ldots X_n$" is an instance of the production associated with the internal node. A derivation tree is complete is its root node is labeled with the start symbol of the grammar and every leaf node (i.e., a node with no children) is labeled with a terminal symbol. FIG. 1 shows an example of complete derivation trees for the grammar in the example above.

Figure 2:
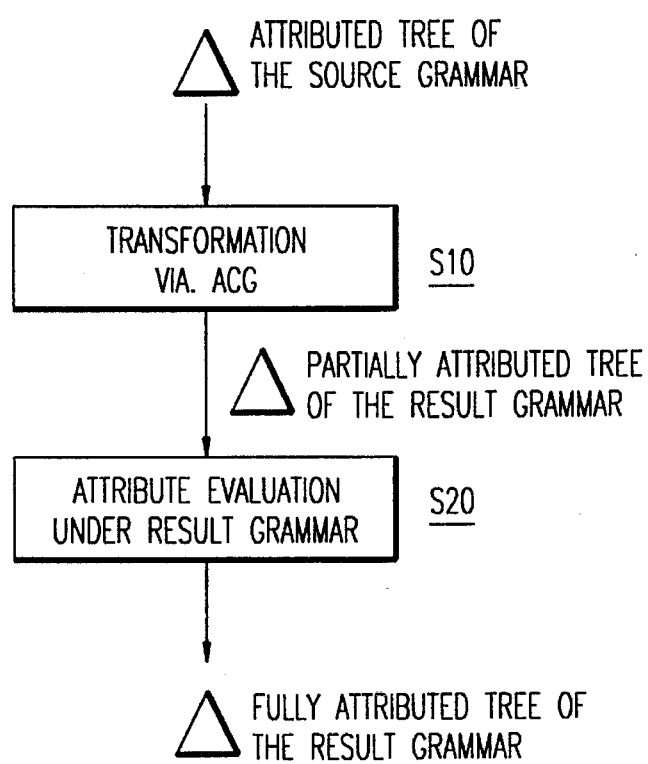
FIG. 2 is a generalized flowchart of the method of this invention.

This generic structure and attributes of the structural components of a document are given by an extension of conventional attribute grammars, as shown in FIG. 2. Document transformation is then given by a mapping from attributed trees of a source extended attribute grammar to attributed trees of a result extended attribute grammar (Step S10). A critical point is that such mappings themselves are specified by a special form of extended attribute grammars, extended attribute couplings. The document transformation is then computed as an attribute evaluation process under the attribute coupling grammars. An input to this process is an attributed tree of the result attribute grammar. Finally, the remaining attributes of this tree are evaluated under the result grammar for full attribution (STEP S20).

Figure 4:
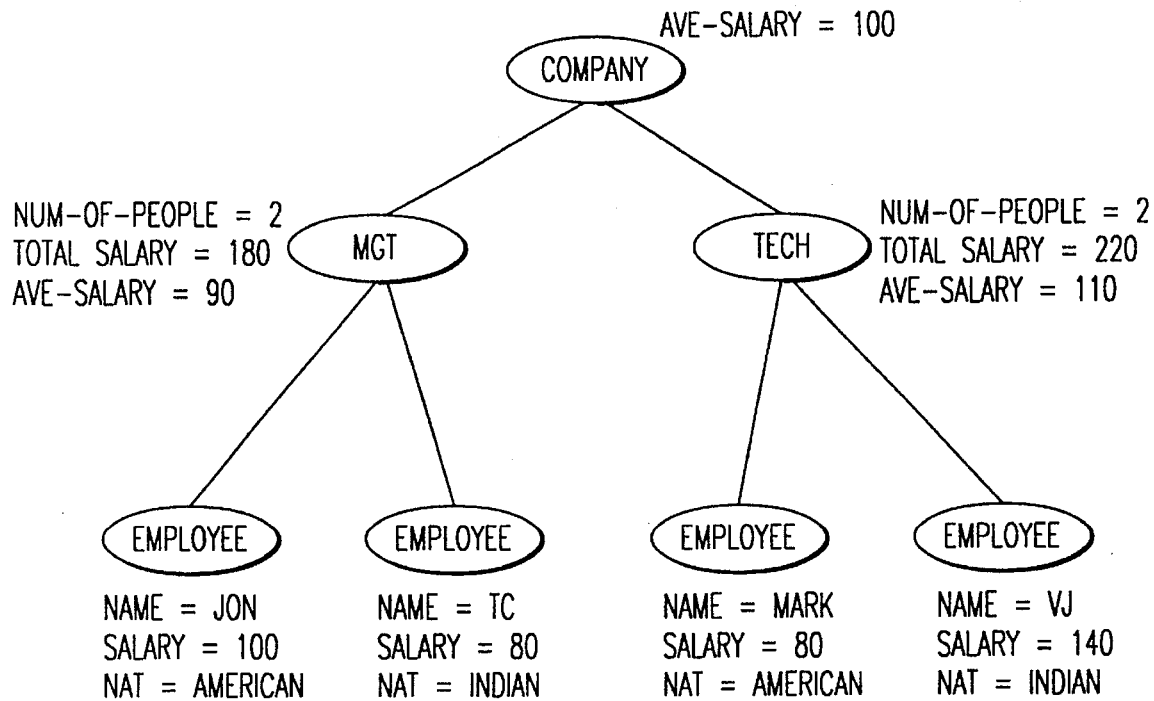
FIG. 4 is a source tree generated from the extended attribute grammar for the first document.
Figure 6:
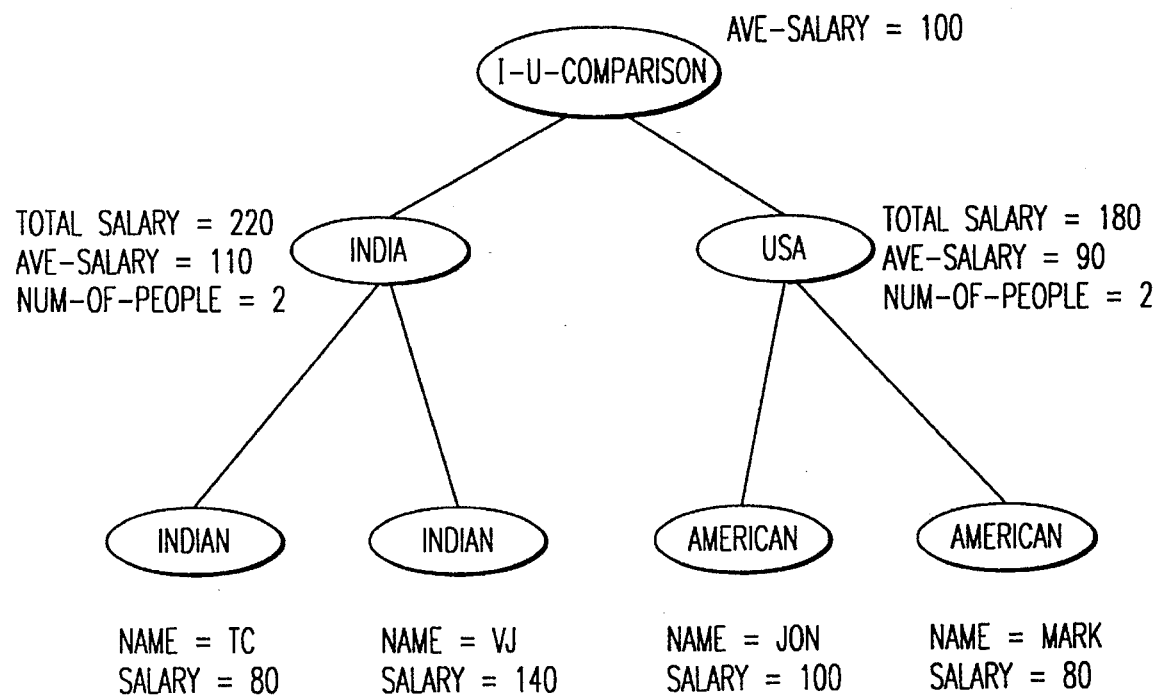
FIG. 6 is a result tree of the second extended attribute grammar for the second document.

FIGS. 3–6 show the extended attribute grammars and resulting trees for a pair of documents. FIG. 3 shows a first extended attribute grammar for a first document. FIG. 4 shows the attributed tree generated from the first document based on the first extended attribute grammar. In contrast, FIG. 5 shows a second attribute grammar of a second document and FIG. 6 shows a second tree generated from the second document based on the second extended attribute grammar. Since, in the following example, the first document will be transformed into the second document, the first extended attribute grammar, the first tree and the first document will also be referred to as the source extended attribute grammar, the source tree and the source document. Likewise, the second extended attribute grammar, the second tree, and the second document will also be referred to as the result extended attribute grammar, the result tree and the result document.

For example, $G_2=(V_2, \Sigma_2, P_2, Z_2)$ is an extended context-free grammar. For each symbol $X_2$ of $G_2$, a number of sets of attributes exist. A first set of attributes comprises the logical attributes. These attributes are system-defined and include tree attributes. The tree attributes themselves comprise count attributes. The count attribute comprises the number of children of various nodes having the same label.

A second set of attributes comprises the non-logical attributes, which are user-defined. These attributes include imported, inherited, and synthesized attributes. Imported attributes are associated only with start and terminal symbols. In general, once the symbols are declared or defined, the attributes and their types for each of the symbols are then declared.

The types of the symbols are determined based on where they get their inputs. Synthesized attributes obtain their inputs from their children (i.e., the tree branches extending to new symbols from the current symbols). Accordingly, synthesized attributes are generally computed. However, they can also be merely copied from one child symbol.

For inherited attributes, the flow of information is opposite that of synthesized attributes. That is, inherited attributes obtain their inputs from the parent symbols on the tree. Accordingly, inherited attributes are generally merely copied from the parent symbol, although they can also be calculated.

For imported attributes, the flow of information is not within, but between, trees. Thus, imported attributes obtain their inputs from other trees. Further, while only terminal and start symbols have imported attributes, imported attributes can obtain their inputs from any symbol of the other tree. Accordingly, the imported attribute can be either computed from or merely a copy of the inputted attribute value.

These sets are pair-wise disjoint. Every logical attribute has a universal definition. One class of (tree) attributes of this category called count attributes. That is, each symbol X has a count-Y attribute for each symbol Y of the grammar, which represents the number of children labeled "Y". For an example of synthesized and inherited attributes, suppose we have the following production, $$q_0: \text{Lab} \rightarrow \text{Scientist}^+ \qquad (6)$$

Then, the two symbols "Lab" and "Scientist" might have the following attributes. The symbol "Lab" has as its attributes "Total-Patents" which is a synthesized attribute and "Base-Salary" which is an inherited attribute. The symbol "Scientist" has as its attributes "Bonus" and "Patents" which are synthesized attributes and "Total-Salary" which is an inherited attribute.

Each production is then associated with a set of attribution sentences, or simply sentences. These sentences state, for instance, that the number of total patents of Lab is the sum of patents of individual Scientists, or that for each Scientist, his salary is the base salary of Lab together with his bonus.

For notational simplicity, no symbol in a product has multiple occurrences. This is achieved by renaming multiple occurrences via subscripts or the like and by treating each of the multiple occurrences as interchangeable symbols for the purpose of syntactic manipulation such as construction of derivation trees, as usually is done in a convention attribute grammars. However, in the setting of extended context-free grammars, a symbol in a production may occur within a scope of the repetition operators, such as * and + (e.g., Scientist+), and an instance of such a production may have multiple occurrences of a symbol. For example, one instance of the production "$q_0$" of Eq. (6) may be Lab→Scientist Scientist Scientist.

In order to distinguish such occurrences, each symbol in a production is given an array name, and is distinguished from its occurrences within an instance of the production through array indices. Given a production "q: A→r", its array index expression, or simply index expression, is either a positive integer, an index variable, for which we use i,j,k as the count attributes of A, or an arithmetic expression constructed from these symbols. Generally, I,J,K are used to denote index expressions. If "q" is a production of G, then an attribute meta-variable of "q" is in the form "X[I].a", where X is a symbol appearing in "q" and "a" is an attribute of X. For example, the elements of the instance, "$\lambda_1$," can be labeled as Scientist[a].bonus, Scientist[i].bonus, Scientist[i+1].bonus, Scientist[count].bonus, or the like. In the last example, count is an abbreviation for Lab.count-Scientist. When the occurrence of a symbol in a production is outside the scope of the iteration operators, the index is omitted in writing the attribute variables. For example, e.g., Lab.base-salary is used instead of Lab[1].base-salary.

The following points on these variables should be noted. First, the variables of a production are actually meta-variables of scheme-variables in the sense that they will be instantiated to actual variables when a production gets instantiated. Second, if an attribute variable has no occurrences of index variables, this meta-variable ranges over a singleton set consisting of itself. That is, the meta-variable Scientist[1].bonus ranges over the set of actual variables {Scientist[1].bonus}.

Furthermore, for each production, its attribute variables are divided into input and output variables. An attribute variable X[I].a is an output variable if X appears on the left side of the arrow (in which case, I=1) and a is a synthesized attribute of X, or X appears on the right side of the arrow and "a" is an inherited attribute of X. Otherwise, it is an input variable. For instance, for the production "$q_0$" and its example attributes given above, Lab.total-patents and Scientist[1].total-salary are output variables, while Lab.base-salary, Scientist[1].bonus and Scientist[1].patents are input variables.

A metalinguistic means of constructing lists is now introduced, which has the form of:

$$(X[I].a)^K_J \qquad (7)$$

where X[I].a is an attribute variable, and I has a single index variable which ranges from the value of J to the value of K, inclusive. For example (Scientist[i+1].bonus$_1^{count}$ means the list (Scientist[2].bonus, Scientist[3].bonus, . . . , Scientist[count+1].bonus). Again, count is an abbreviation for Lab.count-Scientist.

If some predefined set of functions and constants are assumed, which are referred to as external functions and constants, then "q: A→Ar" is a production. The attribution terms of "q: A→r", or simply terms of "q", are those defined as expressions that can be constructed from count attributes of A, attribute variables and list expressions of "q", and external functions. For instance, given the production of Eq.(8):

$$q_0: \text{Lab} \rightarrow \text{Scientist}^+, \quad (8)$$

some of its attribution terms are Scientist[1].bonus, (Scientist[i+1].bonus$_1^{count}$, sum((Scientist[i+1].bonus$_1^{count}$), budget(Lab.name, current-year), and Lab.count-Scientist. In this case current-year is an external constant, and budget an external function (defined by an external database, for instance). A term of "q" is an input term of "q" if every variable appearing in it is an input variable of "q". Finally, an attribution sentence of a production "q" is an universally quantified sentence of the form, $$V_x \in [I_1, I_2] = v = t, \quad (9)$$

where "x" is an index variable, "v" is an output variable of "q" and "t" is an input term of "q". For instance, for the production "$q_0$" above, $$V_i \in [1, \text{count-Scientist}] \text{Scientist}[i].\text{total-salary} = \text{Lab.base-salary} + \text{Scientist}[i].\text{bonus} \quad (10)$$

Given an instance "$\lambda_1$" of "$q_0$: Lab=Scientist Scientist Scientist", this attribution sentence generates the following semantic equations, Scientist[1].total-salary=Lab.base-salary+Scientist[1].bonus Scientist[2].total-salary=Lab.base-salary+Scientist[2].bonus Scientist[3].total-salary=Lab.base-salary+Scientist[3].bonus    (11)

If no free index variables appears in "v=t", the universal quantifier is dropped, and the simple term, "v=t" is used for attribute sentences. For instance, the production "$\lambda_1$" of "$q_0$" may have the attribution sentence:

$$\text{Lab.total-patents} = \text{sum}((\text{Scientist}[i].\text{patents})_1^{count}), \quad (12)$$

which, given the instance "$\lambda_1$: Lab=Scientist Scientist Scientist", generates the following equation, Lab.total-patents=sum((Scientist[1].patents, Scientist[2].patent, Scientist[3].patents))    (13)

An attribution of a production "q" is a set of attribution sentences of "q", and it is complete if it contains exactly one sentence for each output variable of "q" and nothing more.

Thus, an extended attribute grammar is an extended context-free grammar G together with the following additions. First, each symbol of G is associated with synthesized and inherited attributes, and possibly imported attributes (for the case of the start and terminal symbols). Second, each production of G has a complete attribution. Two examples of extended attribute grammars are shown in FIG. 3 and FIG. 5. These two grammars also serve as a source grammar (FIG. 3) and a result grammar (FIG. 5) for an illustration of document transformation. Furthermore, FIGS. 4 and 6 show examples of derivation trees under the source grammar and the result grammar, respectively.

The grammar G=(V,Σ,P,Z) is an extended context-free grammar. The trees $T_1, T_2, \ldots, T_n$ are a sequence of derivation trees of G where the root label of $T_i$ is $A_i$. The grammar G has a production "p: A→r" such that "r" accepts the string "$A_1 A_2 \ldots A_n$". Then the tree constructed from the sequence of $T_i$s by adding a new root labeled with "A" as the parent of the root nodes of the $T_i$s is called a unit reduction of the sequence $T_i$s through p.

More generally, a sequence of trees may admit multiple unit reductions simultaneously. For example, a sequence of trees of G, σ, has a partition into subsequences $\sigma_1, \sigma_2, \ldots \sigma_k$ such that each subsequence σ, has a unit reduction through a production $p_i$ of G. The sequence of these unit reductions is called a reduction of σ through $p_1 p_2 \ldots p_k$. For instance, a sequence of trees $T_1, T_2, T_3, T_4$ has root labels A, B, C, D. An extended context-free grammar G has the productions: "$p_1$: K→AB$^+$" and "$p_2$: L→(C|A)D*". Then the sequence of $T_i$s admits two unit reductions. The first unit reduction is the unit reduction of $T_1 T_2$ through $p_1$. The second is the unit reduction of $T_3 T_4$ through $p_2$. Thus, the tree sequence admits a reduction through $p_1 p_2$.

A G-based reduction operator is a map that takes a sequence of derivation trees of G and produces its reduction. A reduction operator has a syntactic signature, which is a regular expression over the set of production names of G. For instance, assuming G has the productions "$p_1$" and "$p_2$" above, a G-based reduction operator may have a signature $p_1^+(p_2|\epsilon)$. Intuitively, this signature indicates that any reduction operator of this signature must use "$p_1$" one or more times and "$p_2$" at most once, in this order from left to right. For instance, a tree sequence with root labels "A,B,B,A,B, C,D" can be reduced through a reduction operator having the above signature by using $p_1$ twice and then $p_2$ once.

If "δ" is a reduction operator, the regular expression obtained from its signature by replacing each $p_i$ by its left-hand side is called the type of δ, while the regular expression obtained from the signature by replacing each $p_i$ by its right-hand side is called the arity of δ. For instance, if δ has signature $p_1^+(p_2|\epsilon)$, its type of K$^+$(L/ε), while its arity is (AB$^+$)$^+$((C|A)D*|ε). Thus, a reduction operator takes a tree sequence whose root labels form a string accepted by its arity and generates its reduction whose root labels form a string accepted by its type.

Consider a production "q: H→r" with some synthesized and inherited attributes assigned to its symbols. The attribution sentences of "q" involves reduction operators. An attribution of "q" is then G-based if all of its reduction operators are G-based. The grammars $G_1$ and $G_2$ are extended attribute grammars. An extended attribute coupling from $G_1$ to $G_2$ is an extended attribute grammar Γ such that the extended context-free grammar of Γ is the same as that of $G_1$. Then, every production of Γ has a complete $G_2$-based attribution. Further, some synthesized or inherited attributes of Γ are distinguished as syntactic attributes, and the start symbol of Γ has a special syntactic attribute result-tree which is defined through a reduction operator of type $Z_2$, the start symbol of $G_2$. Finally, any symbol of Γ may have imported attributes, and every imported attribute of Γ is an attribute of $G_1$ whereas every imported attribute $G_2$ is an attribute of Γ.

Further, Γ is well-formed if for every production of Γ, its syntactic input variable appears at most once as an argument. Note that if an attribute coupling is well-formed, the value of the syntactic attribute result-tree of $Z_1$ is always a complete derivation tree of $G_2$. FIG. 7 shows an example of attribute couplings from the source grammar shown in FIG. 3 to the result grammar shown in FIG. 5.

Once a transformation is specified in terms of a source extended attribute grammar, an extended attribute coupling and a result extended attribute grammar, the transformation of the source document to the result document consists of three main steps.

First, given source tree is copied to create an initial result tree. The initial result tree keeps only those imported attributes of the coupling grammar. Then, the remaining attributes of the copied tree are evaluated with respect to the extended attribute coupling. This produces a partially attributed result tree of the result grammar. This is produced as the value of the syntactic attribute result-tree of the coupling grammar. Finally, the remaining attributes of the partially attributed tree are evaluated with respect to the result extended attribute grammar. Well-known attribute evaluation algorithms exist that can be used for these two evaluation steps, such as "Attribute Grammars", by P. Deransart, M. Jourdan, and B. Lorho, Springer-Verlag, 1988, New York.

Figure 8:
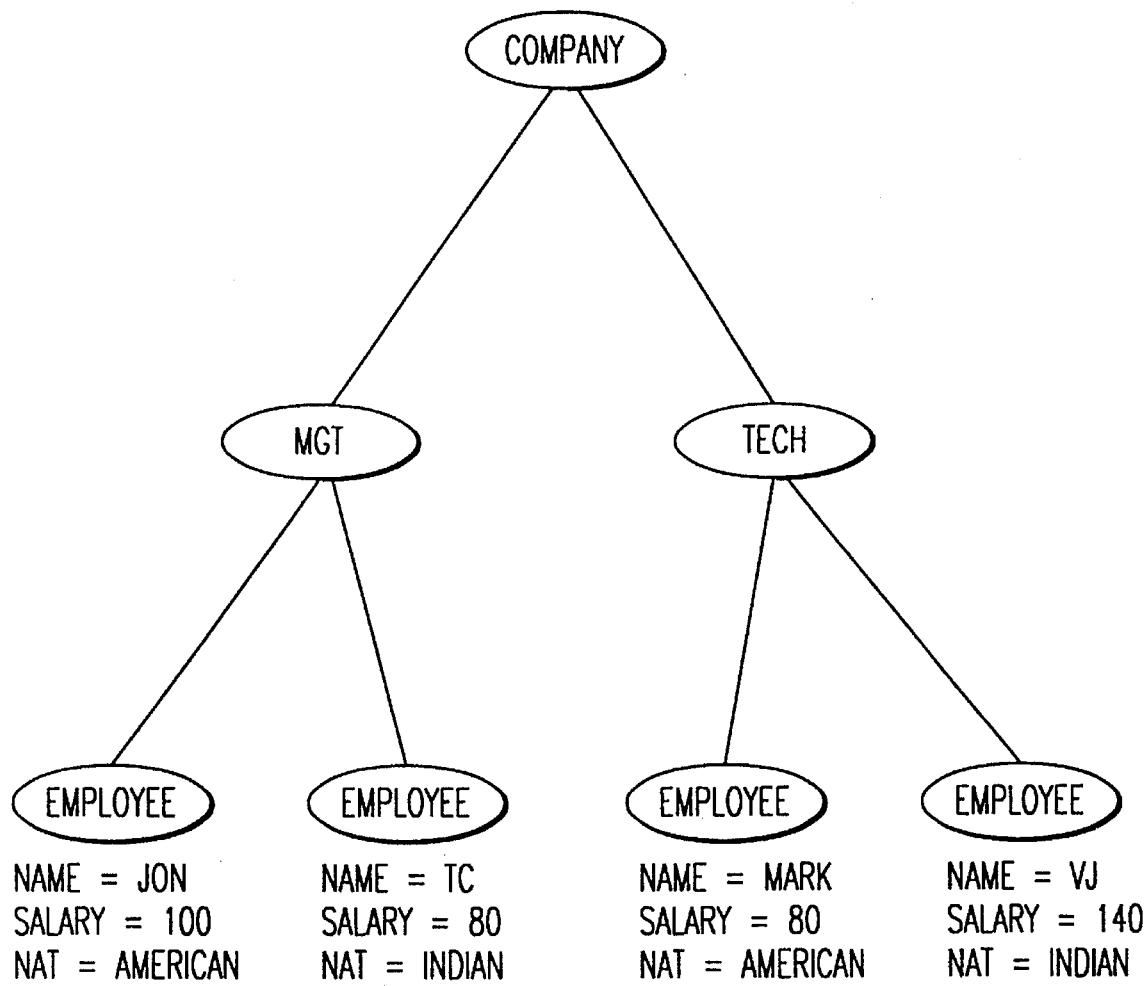
FIG. 8 is an initial result tree having an imported attributes of the attribute coupling grammar generated from the source tree.
Figure 9:
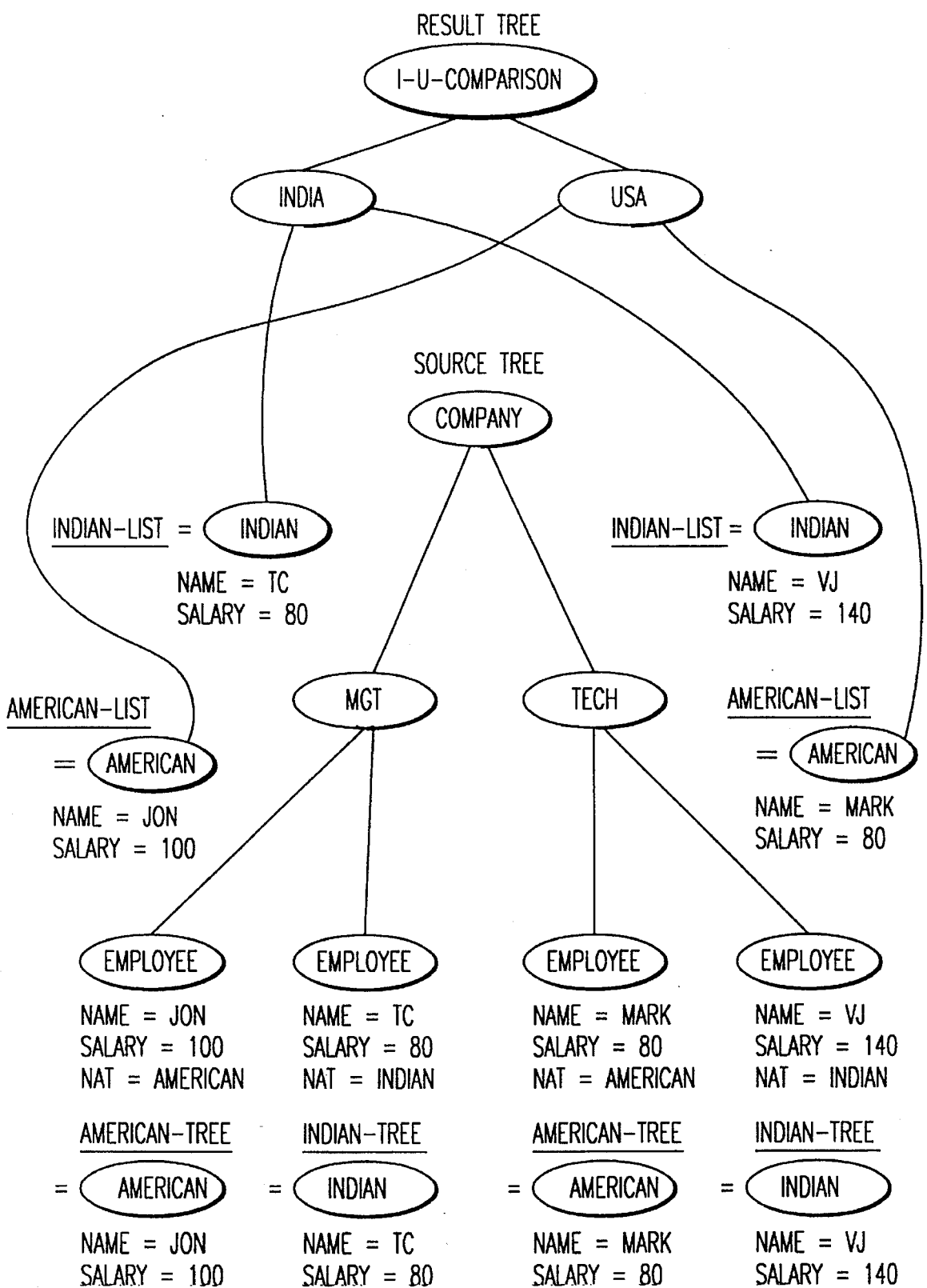
FIG. 9 is the fully attributed tree generated by the attribute coupling grammar from the source tree to generate the result tree.

For an example, take the attributed tree shown in FIG. 4 of the source grammar shown in FIG. 3 as an input to the transformation given by the coupling shown in FIG. 7 and the result grammar shown in FIG. 5. FIG. 7 indicates the symbols of the nodes of the result tree of FIG. 6 by a line over those symbols in the attribution sentences of the attribute coupling of FIG. 7. FIG. 8 shows the copy of the source tree that keeps only those imported attributes of the coupling. FIG. 9 shows result of attribute evaluation with respect to the coupling grammars as set forth in step S10 of FIG. 2. The synthesized attributes of the attribute declaration of FIG. 7 are underlined in the attribute coupling of FIG. 7 and are used to couple imported attributes from the terminal symbols of the source tree to terminal symbols of the result tree. The value of the syntactic attribute result-tree of the root node in that figure is a derivation tree of the result grammar with imported attributes (i.e., name and salary). Finally, this tree is fully attributed, as set forth in step S20 of FIG. 2, with respect to the result grammar, which results in the final result tree shown in FIG. 6.

Figure 10:
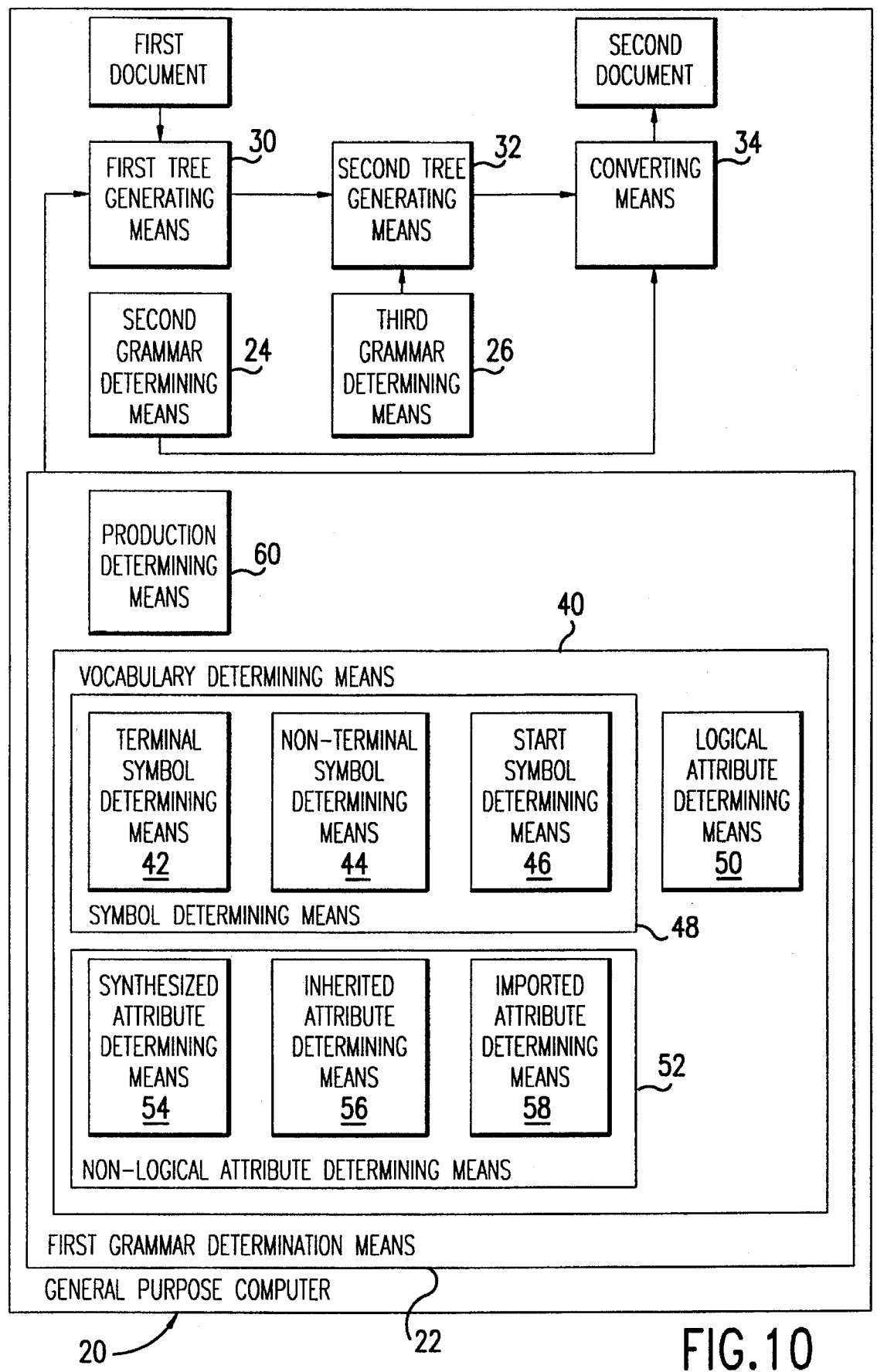
FIG. 10 is a block diagram of the transformation apparatus.

As shown in FIG. 10, the transformation apparatus 20 such as a general purpose computer comprises a first grammar determination means 22 for determining the first extended attribute grammar corresponding to the first document. The transformation apparatus 20 also comprises a second grammar determination means 24 and a third grammar determination means 26 for determining the second extended attribute grammar corresponding to the second document and the extended attribute coupling grammar for transforming the first document to the second document, respectively.

The transformation apparatus 20 also comprises a first tree generating means 30 for generating a first tree from the first extended attribute grammar and the first document. The transformation apparatus 20 also comprises a second tree generating means 32 for generating a tree from the source tree and the extended attribute coupling grammar. Finally, the transformation apparatus 20 comprises a converting means 34, for converting the result tree into the second document.

As also shown in FIG. 10, the first grammar determination means 22 itself comprises a vocabulary determining means 40 for determining the vocabulary of the first extended attribute grammar and a production determining means 60 for determining a production of the first extended attribute grammar. The second grammar determining means 24 and the third grammar determining means 26 generally comprise the same elements and subelements as the first grammar determining means 22. Thus, the following discussion, while relating only to the first grammar determining means 22, is also applicable to the second and third grammar determining means 24 and 26.

Further, the vocabulary determining means 40 comprises a terminal symbol determining means 42 for determining a terminal symbol of the extended attribute grammar. The vocabulary determining means also comprises a non-terminal symbol determining means 44 for determining one or more non-terminal symbols of the extended attribute grammar. Finally, the vocabulary determining means also comprises a start symbol determining means 46 for determining which one of the one or more non-terminal symbols is the start symbol.

Together, the terminal symbol determining means 42, the non-terminal symbol determining means 44 and the start symbol determining means 46 combine to form a generalized symbol determining means 48. The vocabulary determining means 40 further comprises a logical attribute determining means 50 for determining at least one logical attribute for the symbols determined by the symbol determining means 48 and a non-logical attribute determining means 52 for determining at least one non-logical attribute for each of the pluralities of symbols determined by the symbol determining means 48.

The non-logical attribute determining means 52 itself comprises synthesized attribute determining means 54 for determining synthesized attributes for one or more of the plurality of symbols; inherited attribute determining means 56 for determining at least one inherited attribute for one or more of the plurality of symbols; and imported attribute determining means 58 for determining at least one imported attribute for one or both of the terminal symbol and the start symbol determined by the symbol determining means 48.

While the invention has been described in connection with the preferred embodiment, it will be understood that it is not intended to limit the invention to these embodiments. On the contrary, it is intended to cover all alternatives, modifications and equivalents as may be included within the spirit and scope of the invention as defined by the appended claims.

What is claimed is:

1. A method for converting a first document to a second document, the method comprising the steps of:

specifying the first document in terms of a first extended attribute grammar;

specifying the second document in terms of a second extended attribute grammar;

specifying an extended attribute coupling grammar of the first and second extended attribute grammars; and transforming the first document into the second document based on the extended attribute coupling grammar.

2. The method of claim 1, wherein the step of specifying a first extended attribute grammar comprises the steps of:

specifying a vocabulary of the first extended attribute grammar; and specifying at least one production of the first extended attribute grammar.

3. The method of claim 2, wherein the step of specifying the vocabulary of the first extended attribute grammar comprises the steps of:

specifying at least one non-terminal symbol;

specifying at least one terminal symbol; and specifying one non-terminal symbol as a start symbol.

4. The method of claim 2, wherein the step of specifying the vocabulary of the first extended attribute grammar comprises the steps of:

specifying a plurality of symbols;

specifying at least one logical attribute for each symbol; and specifying at least one non-logical attribute for each symbol.

5. The method of claim 4, wherein the step of specifying the at least one logical attribute for each symbol comprises the step of specifying at least one tree attribute.

6. The method of claim 5, wherein the step of specifying at least one tree attribute comprises specifying at least one count attribute.

7. The method of claim 4, wherein the step of specifying the at least one non-logical attribute comprises the at least one of steps of:

specifying at least one synthesized attribute;

specifying at least one inherited attribute; and specifying at least one imported attribute.

8. The method of claim 1, wherein the step of specifying a second extended attribute grammar comprises the steps of:

specifying a vocabulary of the second extended attribute grammar; and specifying at least one production of the second extended attribute grammar.

9. The method of claim 8, wherein the step of specifying the vocabulary of the second extended attribute grammar comprises the steps of:

specifying at least one non-terminal symbol;

specifying at least one terminal symbol; and specifying one non-terminal symbol as a start symbol.

10. The method of claim 8, wherein the step of specifying the vocabulary of the second extended attribute grammar comprises the steps of:

specifying a plurality of symbols;

specifying at least one logical attribute for each symbol; and specifying at least one non-logical attribute for each symbol.

11. The method of claim 10, wherein the step of specifying the at least one logical attribute for each symbol comprises the step of specifying at least one tree attribute.

12. The method of claim 11, wherein the step of specifying at least one tree attribute comprises specifying at least one count attribute.

13. The method of claim 10, wherein the step of specifying the at least one non-logical attribute comprises the at least one of the steps of:

specifying at least one synthesized attribute;

specifying at least one inherited attribute; and specifying at least one imported attribute.

14. The method of claim 1, wherein the step of specifying the extended attribute coupling grammar comprises the steps of:

specifying a first tree sequence of at least one tree of the first document;

specifying at least one reduction of the first tree sequence;

specifying a second tree sequence of at least one tree of the second document;

specifying at least one reduction of the second tree sequence; and specifying at least one reduction operator.

15. The method of claim 1, wherein the step of transforming the first document of the second document comprises the step of:

generating a first copy of a first tree of the first document, wherein only imported attributes of the extended attribute coupling grammar are copied with the first copy;

evaluating remaining attributes of the first copy based on the extended attribute coupling grammar;

producing a partially attributed tree of the second document based on the evaluating step;

evaluate remaining attributes of the partial attributed tree based on the second extended attribute grammar generating a second tree of the second document based on the evaluating step; and generating the second document from the second tree.

16. An apparatus for transforming a first document into a second document, comprising:

means for determining a first extended attribute grammar corresponding to the first document;

means for determining a second extended attribute grammar corresponding to the second document;

means for determining an extended attribute coupling grammar coupling the first extended attribute grammar and the second extended attribute grammar;

means for generating a first tree from the first extended attribute grammar and the first document;

means for generating a second tree from the first tree and the extended attribute coupling grammar; and means for converting the second tree into the second document.

17. The transformation apparatus of claim 16, wherein the means for determining a first extended attribute comprises:

means for determining a vocabulary of the first extended attribute grammar; and means for determining at least one production of the first extended attribute grammar.

18. The transformation apparatus of claim 17, wherein the vocabulary determining means comprises:

means for determining at least one terminal symbol;

means for determining at least one non-terminal symbol; and means for determining a start symbol from the at least one non-terminal symbol.

19. The transformation apparatus of claim 17, wherein the vocabulary determining means comprises:

means for determining a plurality of symbols;

means for determining at least one logical attribute for each of the plurality of symbols; and means for determining at least one non-logical attribute for each of the plurality of symbols.

20. The transformation apparatus of claim 19, wherein the means for determining at least one non-logical attribute comprises:

means for determining at least one synthesized attribute for the plurality of symbols;

means for determining at least one inherited attribute for the plurality of symbols; and means for determining at least one imported attribute for at least one of a terminal symbol and a start symbol.

* * * * *